(12) United States Patent
An et al.

(10) Patent No.: US 12,415,694 B2
(45) Date of Patent: Sep. 16, 2025

(54) DISPLAY PANEL TRANSFER DEVICE AND MANUFACTURING METHOD OF DISPLAY DEVICE USING THE SAME

(71) Applicant: Samsung Display Co., LTD., Yongin-si (KR)

(72) Inventors: Cheol Geun An, Yongin-si (KR); Eui Yun Jang, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 613 days.

(21) Appl. No.: 17/376,462

(22) Filed: Jul. 15, 2021

(65) Prior Publication Data
US 2022/0089392 A1   Mar. 24, 2022

(30) Foreign Application Priority Data
Sep. 23, 2020 (KR) .......................... 10-2020-0123064

(51) Int. Cl.
*B65H 5/10*  (2006.01)
*B25J 15/06* (2006.01)

(52) U.S. Cl.
CPC ............... *B65H 5/10* (2013.01); *B25J 15/06* (2013.01)

(58) Field of Classification Search
None
See application file for complete search history.

(56) References Cited

U.S. PATENT DOCUMENTS 10,906,186 B2 * 2/2021 Takahashi ............ B25J 15/0616

FOREIGN PATENT DOCUMENTS

| KR | 1020100024581 A | 3/2010 |
|---|---|---|
| KR | 1020120098822 A | 9/2012 |
| KR | 1020160011292 A | 2/2016 |
| KR | 1020170073798 A | 6/2017 |
| KR | 101973941 B1 | 4/2019 |
| KR | 1020190139350 A | 12/2019 |
| KR | 102093949 B1 | 3/2020 |

OTHER PUBLICATIONS

Kawanishi, Dec. 3, 2004, KR1020040101932, entire document. (Year: 2004).*

* cited by examiner

*Primary Examiner* — Michael S Lowe
(74) *Attorney, Agent, or Firm* — CANTOR COLBURN LLP

(57) ABSTRACT

A display panel transfer device includes: an absorption part disposed in parallel with a first direction; a supporting part disposed in parallel with a second direction crossing the first direction; and a moving part, where the absorption part includes a plurality of absorbers disposed in parallel with a third direction crossing the first and second directions, and the supporting part includes a transfer stage disposed in parallel with the first direction.

10 Claims, 21 Drawing Sheets

DISPLAY PANEL TRANSFER DEVICE AND MANUFACTURING METHOD OF DISPLAY DEVICE USING THE SAME

This application claims priority to Korean Patent Application No. 10-2020-0123064, filed on Sep. 23, 2020, and all the benefits accruing therefrom under 35 U.S.C. § 119, the content of which in its entirety is herein incorporated by reference.

BACKGROUND

(a) Field

The disclosure relates to a display panel transfer device and a manufacturing method of a display device using the display panel transfer device.

(b) Description of the Related Art

In a manufacturing process of a display device, various processes are performed, and a display panel being manufactured is transferred to perform these processes.

In such a manufacturing process of a display device, the display panel being manufactured may be physically and chemically affected during the transfer process. Therefore, characteristics of the display panel being manufactured may be changed due to the effect in the transfer process in a subsequent manufacturing process.

SUMMARY

Embodiments are to provide a display panel transfer device that may uniformly maintain a surface tension of a display panel by absorbing and moving the display panel with an absorber during a transfer process of the display panel and a manufacturing method of a display device using the display panel transfer device.

An embodiment of the invention provides a display panel transfer device, including: an absorption part disposed in parallel with a first direction; a supporting part disposed in parallel with a second direction crossing the first direction; and a moving part, where the absorption part includes an absorber disposed in parallel with a third direction crossing the first and second directions, and the supporting part includes a transfer stage disposed in parallel with the first direction.

In an embodiment, the absorber may move in the third direction.

In an embodiment, the transfer stage may move in the second direction.

In an embodiment, the absorber may contact the display panel, and then may be combined with the display panel by providing a vacuum inside the absorber.

In an embodiment, the transfer stage may move under the display panel combined with the absorber to support the display panel.

In an embodiment, the moving part may move the supporting part and the absorption part from an initial position to another position.

Another embodiment of the invention provides a manufacturing method of a display device, including: contacting a non-display portion of a display panel with an absorber; lifting the display panel by raising the absorber; moving a transfer stage toward under the lifted display panel to support the display panel; and simultaneously moving the transfer stage and the display panel supported thereby from an initial position to another position.

In an embodiment, the manufacturing method of the display device may further include, applying a resin to a surface of the display panel after the simultaneously moving the transfer stage and the display panel, and curing the applied resin.

In an embodiment, the manufacturing method of the display device may further include moving the display panel, on which the resin is cured, to the initial position; lifting the display panel by raising the absorber; and reversely moving the transfer stage from under the display panel.

In an embodiment, the absorber may contact the display panel, and then may be combined with the display panel by providing a vacuum inside the absorber.

In an embodiment, the resin may not be applied to the non-display portion of the display panel in the applying the resin to the surface of the display panel.

In an embodiment, the manufacturing process of the display device may further include using a display panel transfer device, where the display panel transfer device may include: an absorption part disposed in parallel with a first direction; a supporting part disposed in parallel with a second direction crossing the first direction; and a moving part, and the absorption part may include the absorber disposed in parallel with a third direction crossing the first and second directions, and the supporting part may include a transfer stage disposed in parallel with the first direction.

Another embodiment of the invention provides a manufacturing method of a display device, including: contacting a non-display portion of a display panel with an absorber; lifting the display panel by raising the absorber; moving a transfer wing part toward under the lifted display panel to support the display panel; and simultaneously moving the transfer wing part and the display panel supported thereby from an initial position to another position.

In an embodiment, the transfer wing part may include a region which supports a lower surface of the display panel and a region which fixes a side surface of the display panel.

In an embodiment, the manufacturing method of the display device may further include, applying a resin to a surface of the display panel after the moving the transfer wing part and the display panel, and curing the applied resin.

In an embodiment, the manufacturing method of the display device may further include: moving the display panel, on which the resin is cured, to the original position; lifting the display panel by raising the absorber; and reversely moving the transfer stage from under the display panel.

In an embodiment, the absorber may contact the display panel, and then may be combined with the display panel by providing a vacuum inside the absorber.

In an embodiment, the resin may not be applied to the non-display portion in the applying the resin to one surface of the display panel.

According to embodiments, as described herein, a panel transfer device may allow a surface tension of a display panel to be maintained uniformly by absorbing and moving the display panel with an absorber during a transfer process of the display panel in a manufacturing method of a display device.

DETAILED DESCRIPTION

Figure 1:
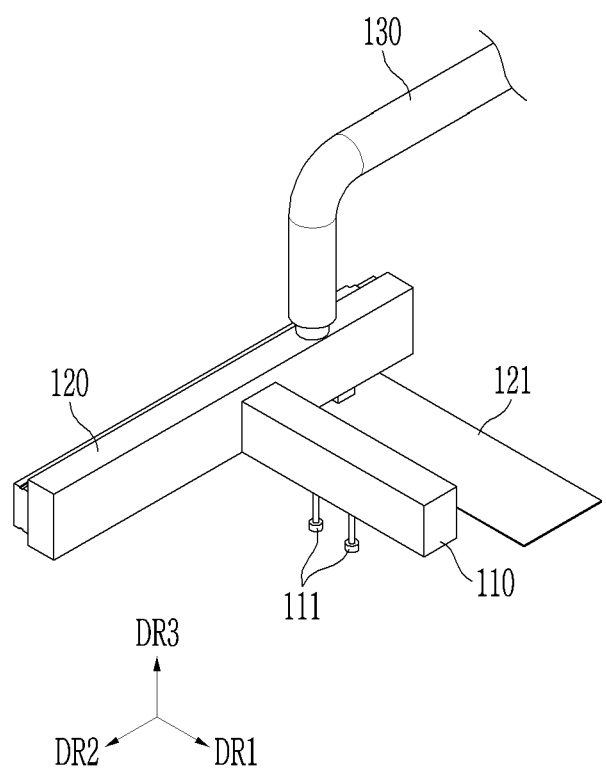
FIG. 1 schematically illustrates a display panel transfer device according to an embodiment.

The invention will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Further, in the drawings, the size and thickness of each element are arbitrarily illustrated for ease of description, and the disclosure is not necessarily limited to those illustrated in the drawings. In the drawings, the thicknesses of layers, films, panels, regions, areas etc., are exaggerated for clarity. In the drawings, for ease of description, the thicknesses of some layers and areas are exaggerated.

It will be understood that when an element such as a layer, film, region, area, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Hereinafter, embodiments of the invention will be described in detail with reference to the accompanying drawings.

First, a display panel transfer device according to an embodiment will be described. FIG. 1 schematically illustrates a display panel transfer device according to an embodiment.

Referring to FIG. 1, an embodiment of a display panel transfer device includes an absorption part 110, a supporting part 120, and a moving part 130.

The absorption part 110 may be positioned parallel to or extend in a first direction DR1. The absorption part 110 may include a plurality of absorbers 111 may be positioned in parallel with a third direction DR3. In such an embodiment, the absorbers may lift a display panel by being attached to a region of the display panel in which a flexible printed circuit ("FPC") is not mounted, that is, a region in which a separate resin is not applied during a manufacturing process of a display device. The absorber 111 may be absorbed to the display panel by providing a vacuum therein through adsorption. Herein, the term "vacuum" may refer to any space in which the pressure therein is considerably lower than atmospheric pressure. The absorbers 111 will be described later in greater detail.

The supporting part 120 may be positioned along or extend in a second direction DR2 crossing the first direction DR1, and a transfer stage 121 is positioned at the supporting part 120. Here, the third direction DR3 may be perpendicular to the first direction DR1 and the second direction DR2. The transfer stage 121 may be positioned parallel to or extend in the first direction DR1. The transfer stage 121 may move along the supporting 120 in the second direction DR2. In such an embodiment, the transfer stage 121 may be moved under the display panel lifted by the absorber 111 to mount or support the display panel on the transfer stage 121. The transfer stage 121 will be described later in greater detail.

The moving part 130 may move the transfer stage in which the display panel is positioned. The moving part 130 may vertically or horizontally move, and the display panel may be transferred by moving the moving part 130.

Hereinafter, a movement of a panel transfer device according to an embodiment will be described with reference to FIG. 2 to FIG. 10. FIG. 2 to FIG. 10 schematically illustrate movement states of a panel transfer device according to an embodiment.

Figure 2:
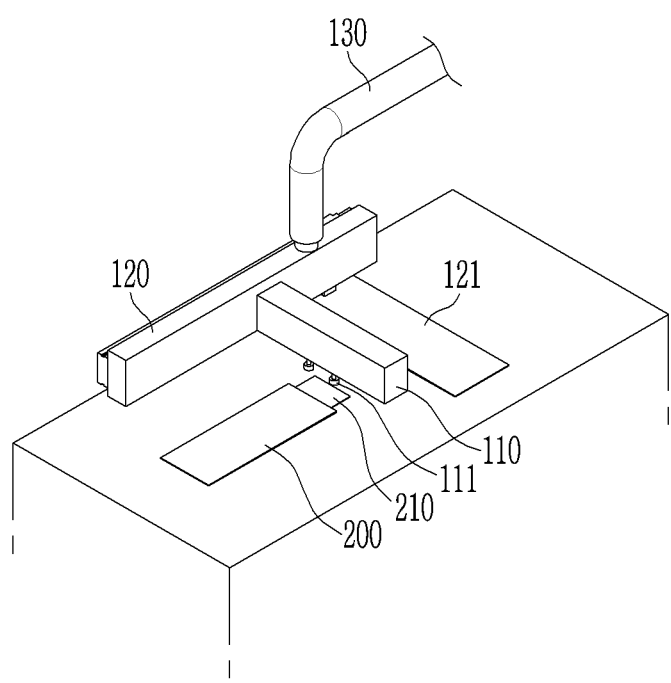
FIG. 2 to FIG. 10 schematically illustrate movement states of a display panel transfer device according to an embodiment.

Referring to FIG. 2, the absorber 111 of the absorption part 110 descends and absorbs a non-display portion 210 of a display panel 200. The non-display portion 210 is a region on which an FPC is not mounted, and is a region in which a resin is not applied during the manufacturing process of the display panel. In this state, the absorber 111 contacts the non-display portion 210 of the display panel 200, and allows the inside of the absorber 111 to be in a vacuum state to be attached to the display panel 200. The non-display portion 210 contacting the absorber 111 is a region on which an FPC is not mounted, and may be a region in which a protective film extends.

Figure 3:
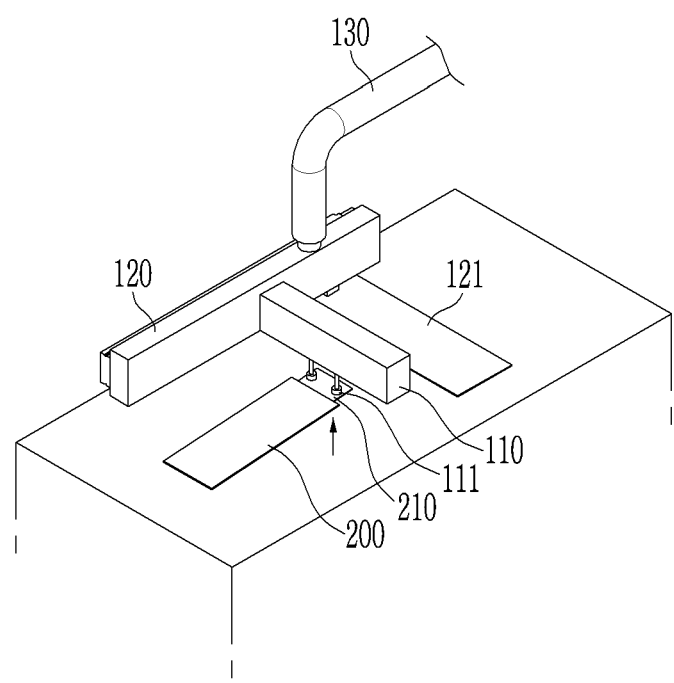

Next, referring to FIG. 3, the display panel 200 is lifted while the absorber 111 rises. Therefore, a separation space is provided between a region on which the display panel 200 was placed and the display panel 200.

Figure 4:
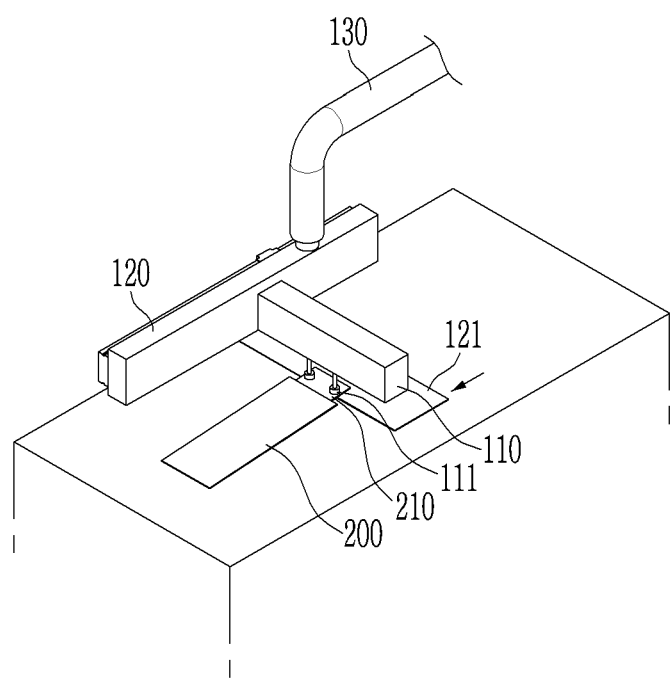

Next, referring to FIG. 4, the transfer stage 121 moves in a state where the display panel 200 is lifted by the absorber 111.

Figure 5:
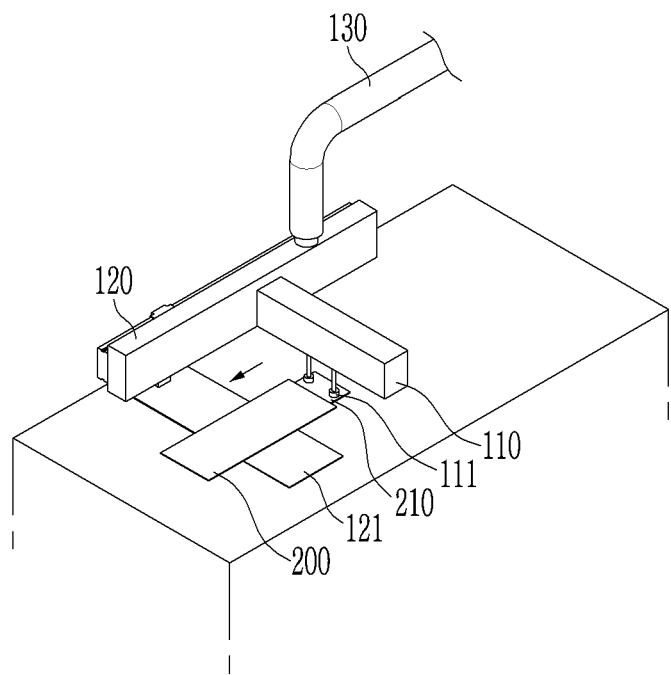

Subsequently, referring to FIG. 5, the display panel 200 is positioned on the transfer stage 121 by moving the transfer stage 121 thereunder.

Figure 6:
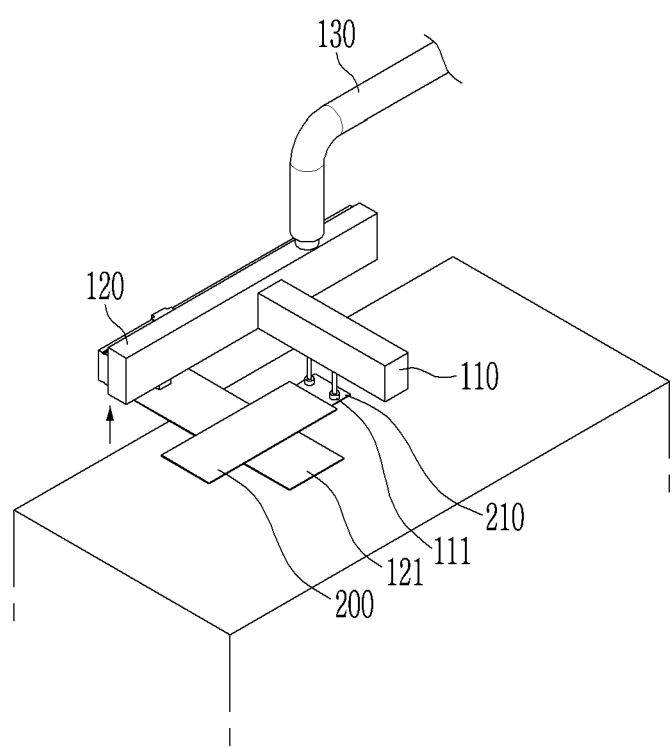

Then, referring to FIG. 6, the transfer stage 121 is moved by the movement of the moving part 130. Therefore, the display panel 200 on the transfer stage 121 is also moved. In an embodiment, the moving part 130 may move left and right, up and down, and circularly. The movement of the moving part 130 may be variously adjusted as desired.

As described above, the display panel 200 is moved by the moving part 130, and a resin may be applied and cured on the display panel 200 to form a coating film thereon.

Figure 7:
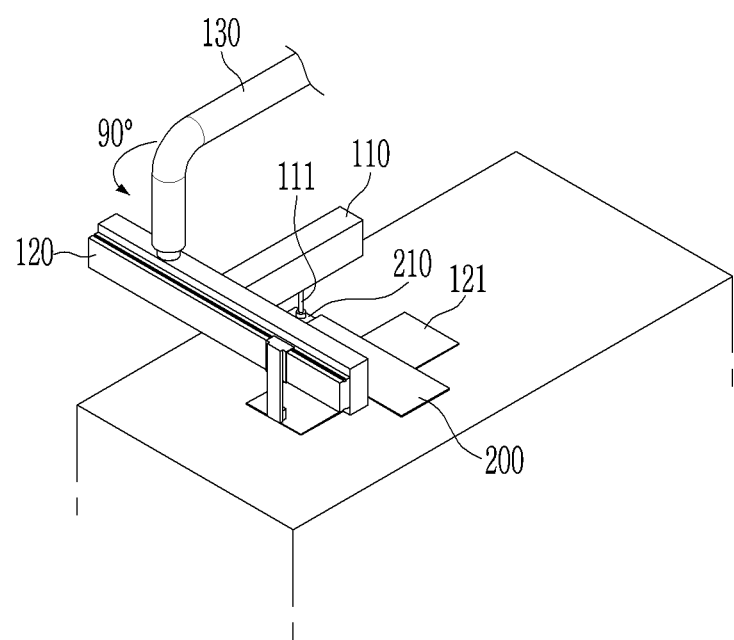

Referring to FIG. 7, the transfer stage 121 is then returned to an original position through the movement of the moving part 130. Therefore, the display panel 200 on which a coating film is formed may also be returned to its initial position. FIG. 7 illustrates the moving part 130 of another direction to show the movement of the moving part 130.

Figure 8:
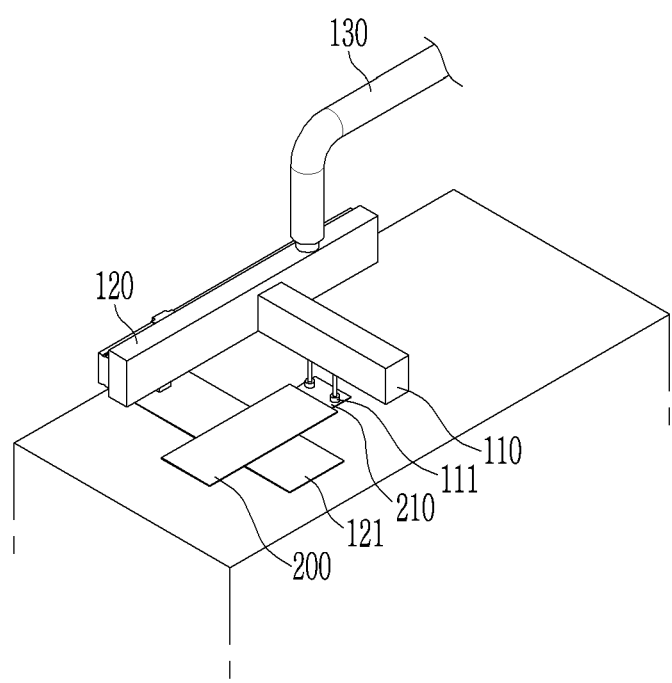

Referring to FIG. 8, the display panel 200 is then lifted as the absorber 111 rises.

Figure 9:
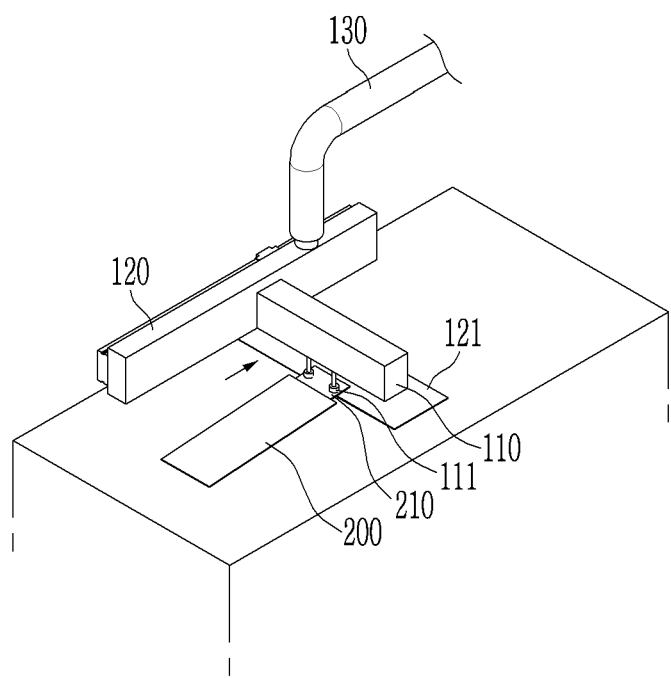

Subsequently, referring to FIG. 9, the display panel 200 is put down by moving the transfer stage 121.

Figure 10:
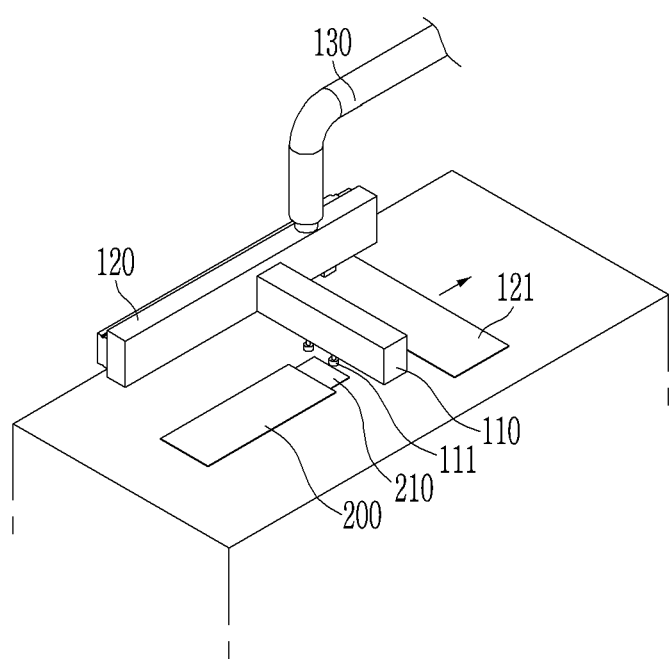

Referring to FIG. 10, the absorber 111 then detaches the display panel 200.

In an embodiment, as shown in FIG. 2 to FIG. 10, the display panel 200 is lifted by using the absorber 111 and the display panel 200 is transferred by using the transfer stage 121 as described above, a surface tension of a surface of the display panel 200 may be uniformly maintained in an entire area thereof during the moving process, after a resin is applied thereon, such that a coating film may be formed uniformly thereon.

Figure 11:
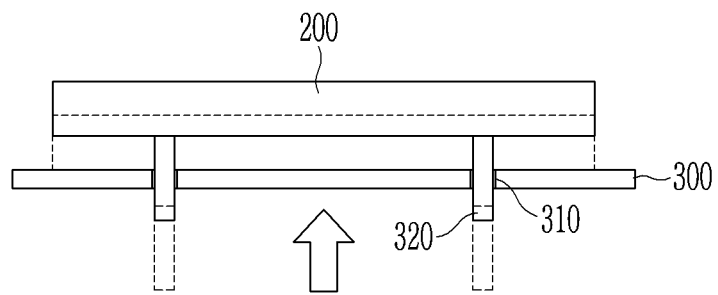
FIG. 11 and FIG. 12 illustrate a conventional moving system of a display panel 200 using a pinhole 310.
Figure 12:
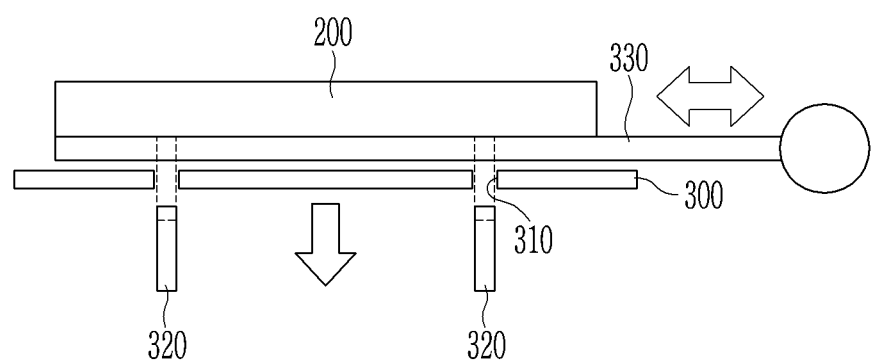

FIG. 11 and FIG. 12 illustrate a conventional moving system of the display panel 200 using a pinhole 310. In a moving system of the display panel 200 using a pinhole 310, as shown in FIG. 11, the pinhole 310 for lifting the display panel 200 is formed in a stage 300, and the display panel 200 may be lifted while a lift pin 320 is raised through the pinhole 310. In this case, a transfer substrate 330 may move between the lifted display panel 200 and the stage 300 to move the display panel 200. However, in this method, when the coating film is formed on the display panel 200, surface tensions of a region of the display panel 200 overlapping the pinhole 310 and of a region of the display panel 200 not overlapping the pinhole 310 may become different from each other, and thus, a coating film may be non-uniformly formed.

Figure 13:
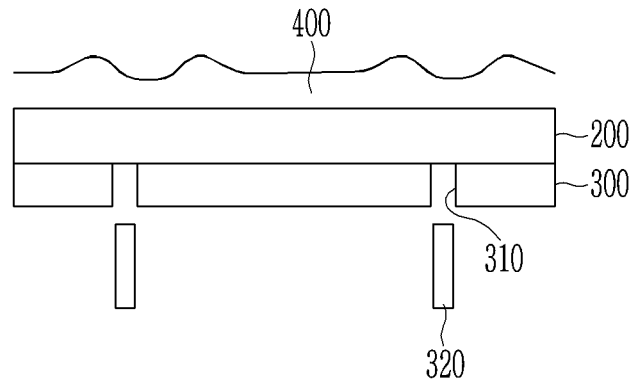
FIG. 13 illustrates a case in which a coating film is non-uniformly formed.

FIG. 13 illustrates a case in which a coating film is non-uniformly formed. As shown in FIG. 13, the coating film 400 on the upper portion of the display panel 200 overlapping the pinhole 310 is formed lower than that of other regions, and the coating film 400 is formed thicker near the pinhole 310 such that a uniform coating film 400 is not formed.

Figure 14:
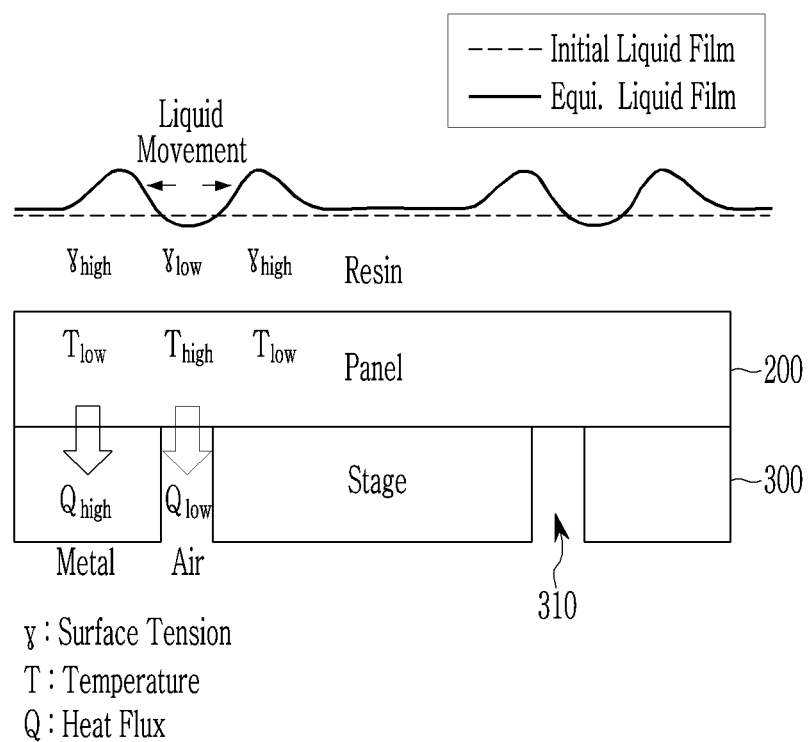
FIG. 14 schematically illustrates a non-uniform coating film caused by the pin hole 310.

FIG. 14 schematically illustrates a non-uniform coating film caused by the pin hole 310. As shown in FIG. 14, since air is positioned instead of the stage 300, which typically includes a metal, in the region in which pinhole 310 is positioned, heat flux is low. Therefore, a temperature of the display panel 200 at an upper portion of the pinhole 310 is higher than a temperature of the display panel 200 in a region that does not overlap the pinhole 310.

As a result, the applied resin moves from a high temperature region to a low temperature region due to the Marangoni effect, and accordingly, as shown in FIG. 14, a thickness of the coating film becomes relatively thin in the region of the pinhole 310, and a thickness of the coating film becomes relatively thick in the region around the pinhole 310.

In embodiments of the invention, the panel transfer device transfers the panel by using the separate absorber 111 instead of the pinhole 310 of the stage 300. In such embodiments, since a portion to which the absorber is attached is a region in which no resin is applied, the surface tension of the surface of the display panel in the resin-coated region is uniformly maintained, and thus a coating film may be formed uniformly on the display panel. Hereinafter, a manufacturing method of a display device according to an embodiment will be described, mainly on a method for transferring a display panel and applying a resin thereto.

Figure 15:
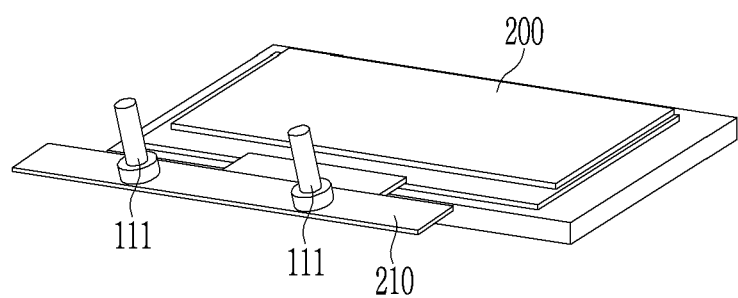
FIG. 15 to FIG. 17 mainly illustrate a display panel transfer process of a manufacturing method of a display device according to an embodiment.
Figure 16:
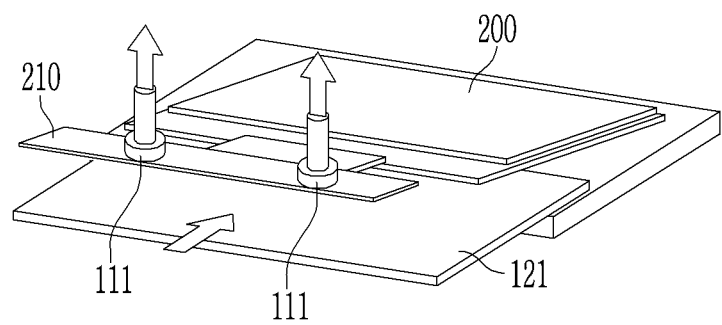
Figure 17:
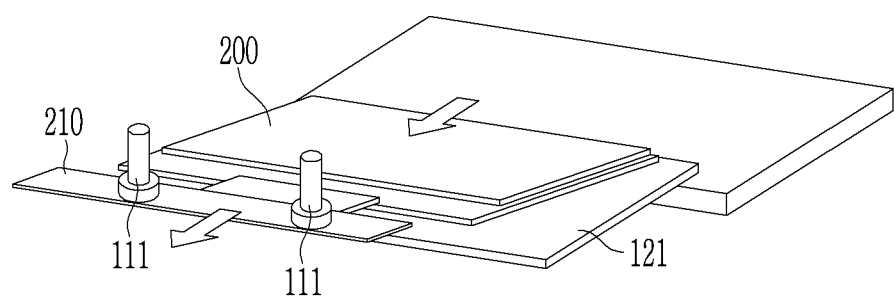

FIG. 15 to FIG. 17 mainly illustrate a display panel transfer process of a manufacturing method of a display device according to an embodiment.

Referring to FIG. 15, in an embodiment, the non-display portion 210 of the display panel 200 is in contact with the absorber 111. The absorber 111 may be a part of the panel transfer device described above with reference to FIG. 1 to FIG. 14. The absorber 111 may be combined with the non-display portion 210 of the display panel 200 by providing a vacuum inside the absorber 111. In such an embodiment, the non-display portion 210 may be a region in which no FPC is mounted, and may be a portion to which no resin is applied during the manufacturing process of the display device.

Referring to FIG. 16, the display panel 200 may be lifted while the absorber 111 is raised or by raising the absorber 111. In such an embodiment, the transfer stage 121 may be moved to be disposed under the lifted display panel 200. That is, the transfer stage 121 may be positioned under the display panel 200.

Next, referring to FIG. 17, the transfer stage 121 and the display panel 200 may be moved. In an embodiment, as such, when the display panel 200 is absorbed through the absorber 111, is positioned on the transfer stage 121, and is transferred by moving the transfer stage 121, the surface tension of the surface of the display panel 200 may be uniformly maintained in the entire area thereof during the moving process, such that the coating film may be formed uniformly on the surface of the display panel 200.

The transferred display panel 200 may be coated with a resin to form a coating film. The display panel 200 on which the coating film is formed may return to the initial position through a reverse process of FIG. 15 to FIG. 17.

In an embodiment of the manufacturing method of the display device, as shown in FIG. 11 to FIG. 14, a separate pinhole or lift pin for moving the display panel is not provided, and thus a coating film is effectively prevented from being non-uniformly formed due to the pinhole and the lift pin.

Figure 18:
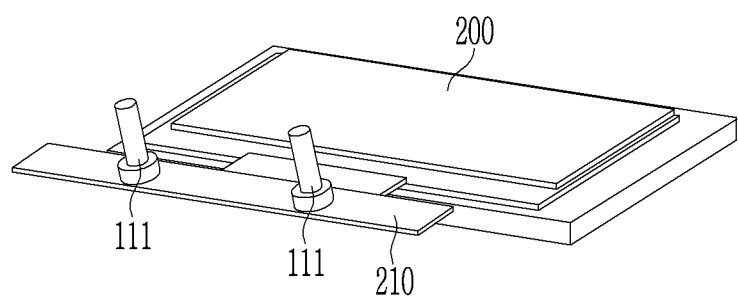
FIG. 18 to FIG. 20 mainly illustrate a display panel transfer process of a manufacturing method according to an alternative embodiment.
Figure 19:
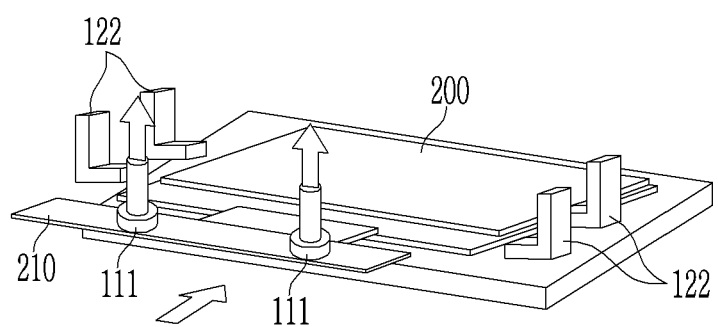
Figure 20:
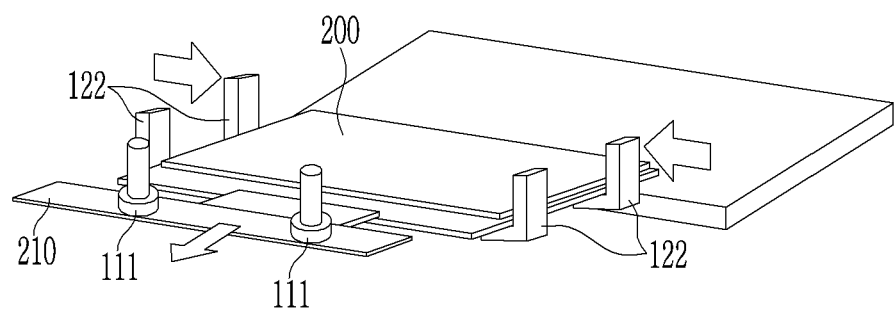

FIG. 18 to FIG. 20 mainly illustrate a display panel transfer process of a manufacturing method according to an alternative embodiment. The manufacturing method shown in FIGS. 18 to 20 is substantially the same as the manufacturing method of FIG. 15 to FIG. 17 except that a transfer wing part 122 is used instead of the transfer stage.

In such an embodiment, referring to FIG. 18, the non-display portion 210 of the display panel 200 is in contact with the absorber 111. The absorber 111 may be combined with the non-display portion 210 of the display panel 200 by providing a vacuum inside the absorber 111.

Next, referring to FIG. 19, the display panel 200 may be lifted while the absorber 111 is raised or by raising the absorber 111. In such an embodiment, the transfer wing part 122 may be moved to be disposed under the lifted display panel 200. A plurality of the transfer wing parts 122 may be provided, and the display panel 200 may be positioned within a region defined by the transfer wing parts 122. That is, as shown in FIG. 19, the transfer wing parts 122 may include a region for supporting a lower surface of the display panel and a region for fixing a side surface of the display panel. The display panel 200 may be fixed by the transfer wing parts 122 to be stably positioned during the transfer process.

Next, referring to FIG. 20, the display panel 200 fixed by the transfer wing part 122 and the transfer wing part 122 may be moved. In such an embodiment, when the display panel 200 is absorbed through the absorber 111, is positioned on the transfer wing part 122, and is transferred by moving the transfer wing part 122, the surface tension of the surface of the display panel 200 may be uniformly maintained in the entire area thereof during the moving process, such that the coating film may be formed uniformly.

Figure 21:
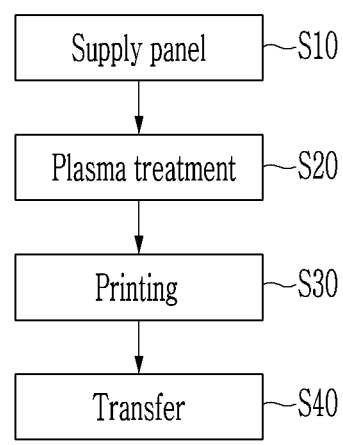
FIG. 21 is a flow chart schematically illustrating a manufacturing process of a display device.

FIG. 21 is a flow chart schematically illustrating a manufacturing process of a display device. Referring to FIG. 21, the panel may be supplied (S10), and then a plasma treatment may be performed through a pretreatment process (S20).

Next, a structure of the display panel may be formed through a printing process (S30), and then the display panel may be transferred through a transfer process (S40) such that a subsequent process may be performed. Subsequent process may include resin coating and curing, and the like, and an embodiment of the panel transfer device described herein may be used for the transfer process.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display panel transfer device configured to transfer a display panel, comprising:
 an absorption structure comprising a first body disposed such that a longest dimension of the first body is in parallel with a first direction; and
 a supporting structure having a second body disposed such that a longest dimension thereof is in parallel with a second direction crossing the first direction,
 wherein the absorption structure includes an absorber extending directly from the first body such that a longest dimension of the absorber is in parallel with a third direction crossing the first and second directions, and
 wherein the supporting structure includes a transfer stage extending from the second body such that a longest dimension of the transfer stage is in parallel with the first direction,
 wherein the transfer stage is configured to move in the second direction,
 wherein the absorber is configured to support a first portion of the display panel from above, and the transfer stage is configured to support a second portion of the display panel from below, the first and second portions not overlapping along the third direction, and
 wherein the display panel transfer device is configured to transfer the display panel while the absorber and the transfer stage simultaneously support the first and second portions of the display panel.

2. The display panel transfer device of claim 1, wherein the absorber is configured to move in the third direction.

3. The display panel transfer device of claim 1, wherein the transfer stage is configured to move in the second direction with respect to the second body.

4. The display panel transfer device of claim 1, wherein the absorber is configured to contact the display panel, and configured to subsequently combined with the display panel by providing a vacuum inside the absorber.

5. The display panel transfer device of claim 4, wherein the transfer stage is configured to move toward under the display panel combined with the absorber to support the display panel.

6. The display panel transfer device of claim 1, further comprising:
 a moving structure configured to move the supporting structure and the absorption structure from an initial position to another position.

7. The display panel transfer device of claim 1,
 wherein the absorber is configured to absorb the display panel than move in the third direction to lift the display panel in the third direction, and
 wherein the transfer stage is configured to move in the second direction from a first position in which the transfer stage is offset from the absorbers to a second position in which the transfer stage overlaps the absorbers such that the transfer stage is positioned under the display panel lifted by the absorber.

8. The display panel transfer device of claim 1, wherein the first body extends in the first direction from a side of the second body.

9. The display panel transfer device of claim 1, wherein the transfer stage extends in the first direction from an underside of the second body.

10. The display panel transfer device of claim 1, wherein the transfer stage is a flat shape having a thickness thereof in the third direction.

* * * * *